US009215085B2

United States Patent
Kruglick

(10) Patent No.: US 9,215,085 B2
(45) Date of Patent: Dec. 15, 2015

(54) ITERATIVE SIMULATION OF REQUIREMENT METRICS FOR ASSUMPTION AND SCHEMA-FREE CONFIGURATION MANAGEMENT

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 484 days.

(21) Appl. No.: 13/576,471

(22) PCT Filed: Jan. 19, 2012

(86) PCT No.: PCT/US2012/021810
§ 371 (c)(1),
(2), (4) Date: Aug. 1, 2012

(87) PCT Pub. No.: WO2013/109274
PCT Pub. Date: Jul. 25, 2013

(65) Prior Publication Data
US 2013/0191531 A1    Jul. 25, 2013

(51) Int. Cl.
*G06F 15/173* (2006.01)
*H04L 12/26* (2006.01)
*H04L 12/24* (2006.01)

(52) U.S. Cl.
CPC ........ *H04L 12/2692* (2013.01); *H04L 41/5038* (2013.01); *H04L 41/12* (2013.01); *H04L 41/5064* (2013.01)

(58) Field of Classification Search
CPC . H04L 12/2692; H04L 41/12; H04L 41/5038; H04L 41/5064
USPC ........................................................ 709/224
See application file for complete search history.

(56) References Cited

U.S. PATENT DOCUMENTS

| 7,904,540 B2 * | 3/2011 | Hadad et al. ............ 709/223 |
| 8,121,877 B2 * | 2/2012 | Chang et al. ........... 705/7.11 |
| 2010/0125473 A1 | 5/2010 | Tung et al. |
| 2010/0232299 A1 | 9/2010 | Conway |

(Continued)

FOREIGN PATENT DOCUMENTS

| JP | 2005316696 A | 11/2005 |
| JP | 2009134687 A | 6/2009 |
| JP | 2011118451 A | 6/2011 |

OTHER PUBLICATIONS

Amazon EC2 Service Level Agreement; http://aws.amazon.com/ec2-sla/ [Jul. 24, 2012 5:20:59 PM], 2 pages.

(Continued)

*Primary Examiner* — Kevin Bates
*Assistant Examiner* — Nazia Naoreen
(74) *Attorney, Agent, or Firm* — Turk IP Law, LLC

(57) ABSTRACT

Technologies are presented for a method and a system that is configured to receive a topology description of an existing customer deployment and a set of achieved performance metrics at a current datacenter and iterate simulations using policy settings across available service levels to find settings that match or exceed the achieved performance levels. Customer specifications may be received in a standardized format along with measured performance so that settings can be derived from fundamental simulation. The resulting simulations may be used to generate a menu of options and their performance automatically for a customer and that information may be provided to a configuration manager when the customer chooses a setup.

20 Claims, 7 Drawing Sheets

(56) References Cited

U.S. PATENT DOCUMENTS

| | | | |
|---|---|---|---|
| 2010/0319004 | A1 | 12/2010 | Hudson et al. |
| 2011/0029810 | A1* | 2/2011 | Jaisinghani ............... 714/7 |
| 2011/0054878 | A1 | 3/2011 | Zhang et al. |
| 2011/0055377 | A1 | 3/2011 | Dehaan |
| 2011/0289329 | A1 | 11/2011 | Bose et al. |

OTHER PUBLICATIONS

Cloud Computing, Cloud Hosting & Online Storage by Rackspace; http://www.rackspace.com/lp/rackspace_cloud_platforms?cm_mmc=PPCCloudBrand-_-Google-_-broad-_-cloud+rackspace [Jul. 31, 2012 11:00:15 PM], 2 pages.

3tera's Cloud Computing SLA goes live; http://blog.3tera.com/computing/175/ [Jul. 24, 2012 5:24:02 PM], 3 pages.

CloudSim: A Framework for Modeling and Simulation of Cloud Computing Infrastructures and Services;The Cloud Computing and Distributed Systems (CLOUDS) Laboratory, University of Melbourne http://www.cloudbus.org/cloudsim/[Jul. 24, 2012 5:24:34 PM], 5 pages.

Class NetworkTopology; java.lang.Object; org.cloudbus.cloudsim.NetworkTopology http://www.cloudbus.org/cloudsim/doc/api/org/cloudbus/cloudsim/NetworkTopology.html[Jul. 24, 2012 5:25:16 PM], 4 pages.

Medina, et al., "BRITE: An approach to universal topology generation," in mascots (Published by the IEEE Computer Society, 2001), 8 pages.

Scalable Simulation Framework (SSF), http://www.ssfnet.org/homePage.html [Jul. 24, 2012 5:27:53 PM], 4 pages.

Claffy, et al. "Measurement and Visualization of Internet Connectivity and Performance" http://www.caida.org/tools/measurement/skitter/[Jul. 24, 2012 5:28:27 PM].

Ghosh, et al., "Self-healing systems—survey and synthesis," Decision support systems 42, No. 4 (2007): 2164-2185.

Kandula, et al., "The nature of data center traffic: measurements & analysis," in Proceedings of the 9th ACM SIGCOMM conference on Internet measurement conference (ACM, 2009), 202-208.

International Search Report PCT/US12/21810 filed Jan. 19, 2012, mailed May 10, 2012.

International Preliminary Report on Patentability for PCT/US2012/021810 filed Jan. 19, 2012, mailed on Jul. 31, 2014, issued Jul. 22, 2014.

* cited by examiner

COMPUTER PROGRAM PRODUCT 700

SIGNAL-BEARING MEDIUM 702

704 AT LEAST ONE OF
    ONE OR MORE INSTRUCTIONS FOR RECEIVING DEPLOYMENT MAP & MEASURED APP. PERFORMANCE;
    ONE OR MORE INSTRUCTIONS FOR RUNNING SIMULATION;
    ONE OR MORE INSTRUCTIONS FOR IF RESULTS ≥ MEASURED APPLICATION PERFORMANCE, ADDING POLICY SETTING AS CUSTOMER OPTION; AND
    ONE OR MORE INSTRUCTIONS FOR IF RESULTS < MEASURED APPLICATION PERFORMANCE, ITERATING THROUGH POLICY SETTINGS.

| COMPUTER-READABLE MEDIUM 706 | RECORDABLE MEDIUM 708 | COMMUNICATIONS MEDIUM 710 |

FIG. 7

ITERATIVE SIMULATION OF REQUIREMENT METRICS FOR ASSUMPTION AND SCHEMA-FREE CONFIGURATION MANAGEMENT

CROSS-REFERENCE TO RELATED APPLICATIONS

This Application is the National Stage filing under 35 U.S.C. 371 of PCT Application No. PCT/US2012/021810 filed on Jan. 19, 2012. The PCT application is hereby incorporated by reference in its entirety.

BACKGROUND

Unless otherwise indicated herein, the materials described in this section are not prior art to the claims in this application and are not admitted to be prior art by inclusion in this section.

With the advance of networking and data processing technologies, an increasingly high number of services are provided through datacenters. A datacenter is a centralized repository for the storage, management, and dissemination of data and information organized around particular bodies of knowledge or pertaining to one or more particular organizations. Some datacenters may provide data storage, application execution platform, and similar services to multiple customers. Other datacenters may be specialized on managing tasks for clients such as collection, processing, and/or analysis of data.

Services provided by a datacenter to its customers are typically specified by Service Level Agreements (SLAs). The SLAs may define service parameters such as data storage capacity, access timing, guaranteed uptime, and similar aspects. Moving customers to a new datacenter is more than a question of matching specifications listed on an SLA. Common SLAs may often be brief or non-specific, lacking specific metrics. Even a complex schema providing important metrics may, however, not capture the nuances of signaling timing and system interactions.

While data centers troubleshoot and adjust large deployments continuously so that a customer's application(s) work well with the particular shortcomings of a datacenter, an origin datacenter losing a customer may not want to share their troubleshooting discoveries and not wish to be responsible for a set of requirements implemented at a destination data center that might not work in that datacenter.

Thus, conventional approaches provide an incomplete picture of what might happen to a customer's applications/data when those are moved from one datacenter to another, increasing a risk that unexpected incompatibilities or errors may occur following migration to a new datacenter.

SUMMARY

The present disclosure generally describes technologies for implementing iterative simulation of measured performance for schema-free configuration management in cloud migration.

According to some examples, a method for configuration management in cloud migration based on iterative simulation of measured performance may include receiving a topology description of an existing customer deployment and a set of achieved performance levels at a current datacenter, combining the topology description with a test set of policy settings, and iterating one or more simulations using the test set of policy settings across available service levels to find policy settings that at least match the achieved performance levels.

According to other examples, a computing device for implementing configuration management in cloud migration based on iterative simulation of measured performance may include a memory configured to store instructions and a processing unit configured to execute a migration application in conjunction with the instructions. The migration application may receive a topology description of an existing customer deployment and a set of achieved performance levels at a current datacenter; combine the topology description with a test set of policy settings; and iterate one or more simulations using the test set of policy settings across available service levels to find policy settings that at least match the achieved performance levels.

According to further examples, a computer-readable storage medium may have instructions stored thereon for configuration management in cloud migration based on iterative simulation of measured performance. The instructions may include receiving a topology description of an existing customer deployment and a set of achieved performance levels at a current datacenter; combining the topology description with a test set of policy settings; and iterating one or more simulations using the test set of policy settings across available service levels to find policy settings that at least match the achieved performance levels.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein.

DETAILED DESCRIPTION

Figure 1:
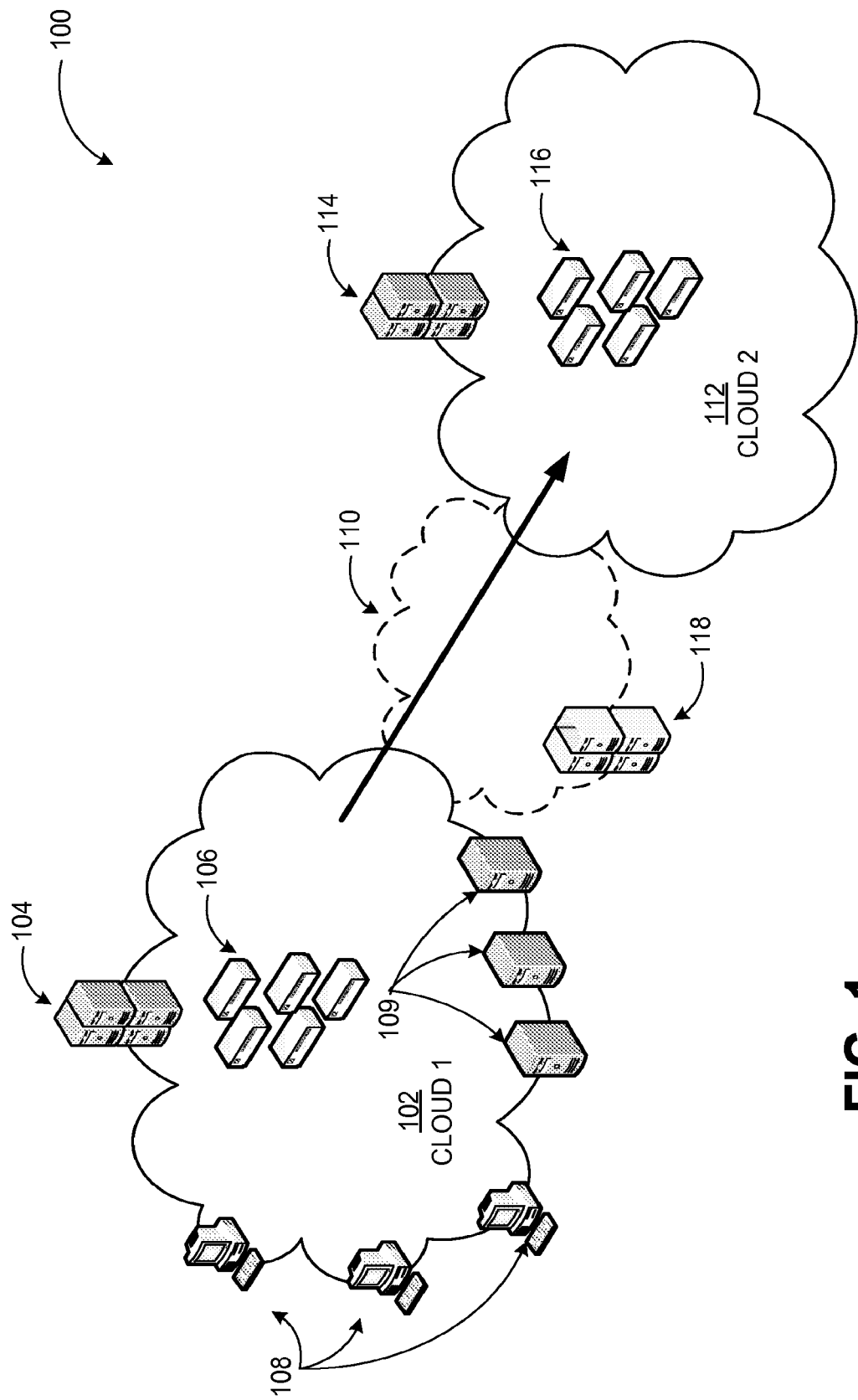
FIG. 1 illustrates an example system, where iterative simulation of measured performance may be used for schema-free configuration management in cloud migration may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to implementing iterative simulation of measured performance for schema-free configuration management in cloud migration.

Briefly stated, technologies are presented for a system that is configured to receive a topology description of an existing customer deployment and a set of achieved performance metrics from a current datacenter and iterate simulations using policy settings across available service levels to find settings that match or exceed the achieved performance levels. Customer specifications may be received in a standardized format along with measured performance so that settings can be derived from fundamental simulation. The resulting simulations may be used to generate a menu of options and their performance automatically for a customer and that information may be provided to a configuration manager when the customer chooses a setup.

FIG. 1 illustrates an example system, where iterative simulation of measured performance may be used for schema-free configuration management in cloud migration may be implemented, arranged in accordance with at least some embodiments described herein.

A datacenter is a centralized repository for the storage, management, and dissemination of data and information organized around particular bodies of knowledge or pertaining to one or more particular organizations. Datacenters also provide a cloud-based platform for various customer applications. A customer (or "tenant") of a datacenter may provide services to its own customers or users through one or more applications executed and managed at a datacenter such as cloud-based gaming applications, collaboration applications, and comparable ones.

As shown in a diagram 100, a datacenter or a cloud 102 may include multiple servers 104, specialized devices 106 (e.g., routers, firewalls, etc.), and data stores. The cloud 102 may include multiple virtual datacenters distributed over multiple physical machines. Applications executed at the cloud 102 may be accessed by customer devices such as computers 108 and/or servers 109.

With the proliferation of cloud-based technologies and increased competition between service providers, migration of customers from one datacenter to another is an increasingly frequent occurrence. Customer relationships with datacenter providers are typically defined by SLAs. However, SLAs with different datacenter providers may define service specifications at varying detail levels or varying terminology. Furthermore, structures and capabilities of datacenters may vary making direct comparison of performance and other metrics difficult. Thus, it would be beneficial for a destination datacenter to actually demonstrate to a potential customer the expected performance for their implemented architecture and services on the new datacenter over a range of conditions and service level offerings. Additionally, customer transfers may be enabled if the communication of customer needs do not take the form of management values subject to implementation and interpretation but are a set of observed measurements instead of implementation policies, thereby relieving the origin datacenter of responsibility and eliminating concerns of unfair transfer behaviors.

In a system according to some embodiments, measured performance may be used for schema-free configuration management in cloud migration through iterative simulation by a destination datacenter (a cloud 112) managed by servers 114 and employing other devices 116 or by a third party entity 110 managed by servers 118.

Furthermore, a system according to some embodiments may employ fewer number of defined requirements (topology and final results) while enabling a more thorough comparison by allowing the destination datacenter (the cloud 112) to find solutions that exceed target performance even if it is achieved using different policies. A burden on the origin datacenter (the cloud 102) for migrations may be reduced by no longer necessitating the origin datacenter to suggest policies at the destination datacenter (the cloud 112) and simply having to provide factual quantitative measurements. The destination datacenter may be allowed to develop policies from the received measurements. Measurements may also be taken by the customer without the knowledge of original datacenter (cloud 102).

Figure 2:
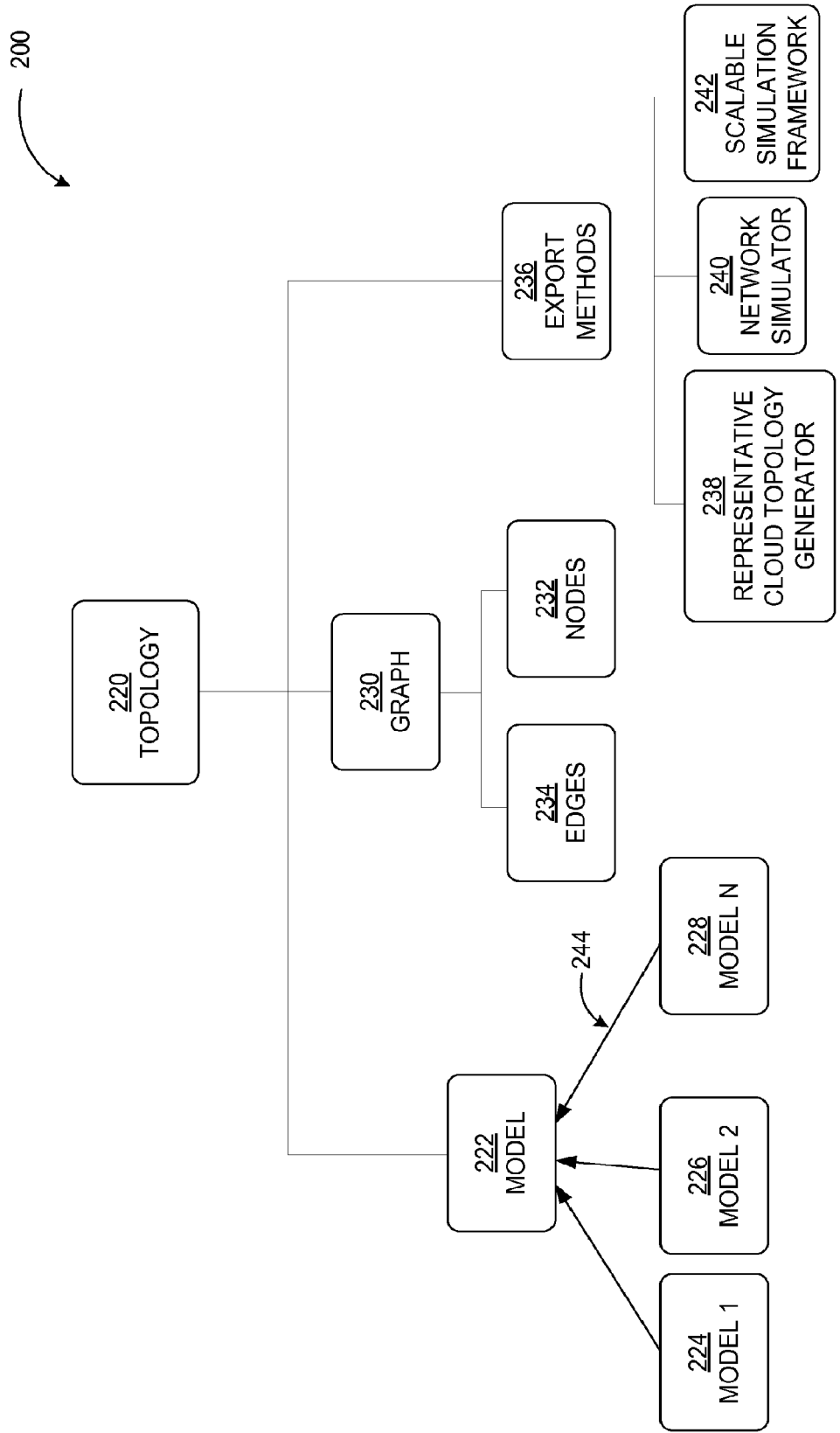
FIG. 2 illustrates an example cloud topology structure.

FIG. 2 illustrates an example cloud topology structure, arranged in accordance with at least some embodiments described herein.

To execute simulation(s) at a target datacenter to compare expected performance to measured performance results at the origin datacenter, a system according to some embodiments may take a standardized input format for the deployment topology. One example of standardized format that may be used to provide deployment topology may be the Boston University Representative Internet Topology Generator (BRITE).

BRITE is a flexible topology generator supporting multiple generation models. BRITE may read the generation parameters from a configuration file, which may be manually prepared by a user or automatically generated by a modeling application. Topologies generated by other topology generators may also be imported or topological data gathered directly from the Internet may be used. The generation process may include placing nodes in a plane, interconnecting the nodes, assigning attributes to topological components (e.g., delay, reliability, distribution, and bandwidth for links, autonomous system (AS) identifiers for router nodes, etc.), and outputting the topology to a specific format.

In BRITE, a topology may be represented by a class topology 220 as shown in a diagram 200. This class may include a model 222 and a graph 230 as data members, and among others, a set of exporting methods 236. Topologies may be exported to a Scalable Simulation Framework (SSF) 242, a network simulator 240, or another representative cloud topology generator (e.g., BRITE) instance.

The model 222 class is an abstract base class from which multiple specific generation models (224, 226, and 228) may be derived (244). Each specific topology generated by BRITE may use a single instance of a generation model if the generated topology is flat or more than one instance if the topology is a combined hierarchical topology. The graph 230 data member may be a graph class with minimal functionality required by the generation models. The graph 230 may include edges 234 and nodes 232 representing the network topology in the graphic representation.

Figure 4:
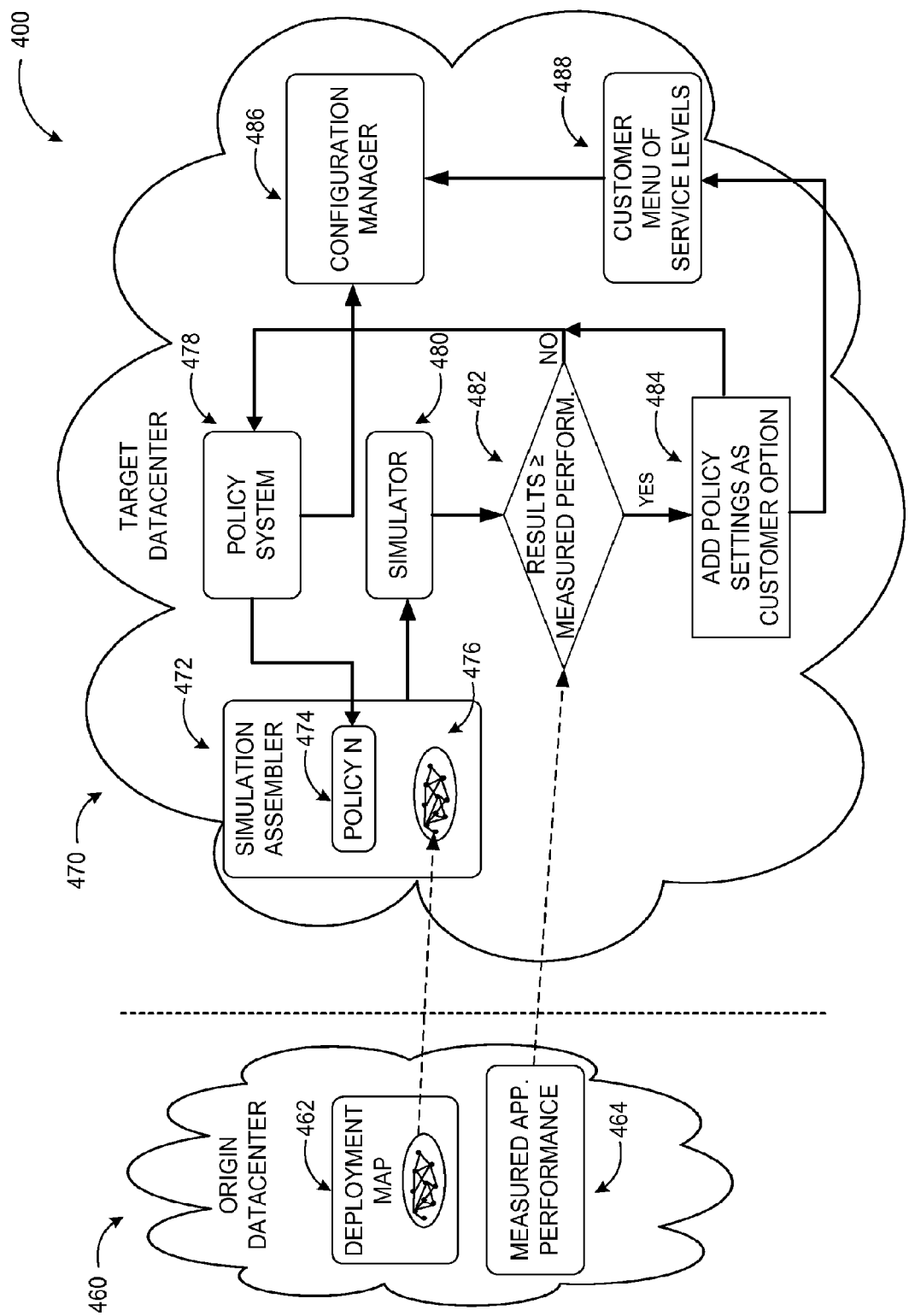
FIG. 4 illustrates conceptually a system for use of iterative simulation of measured performance for schema-free configuration management in cloud migration.

An output file of BRITE or similar generator may be used for a deployment map 462 in FIG. 4. The tree structure provided by the model generator may handle connectivity, models, traffic data, and more. Beyond extracting topology a datacenter is typically an accommodating environment for generating a good model: quantifying traffic and activity. The datacenter may collect sufficient data to provide snapshots of traffic and activity at each node in an extracted deployment so that a full model can be provided.

A model data for some example embodiments may include snapshot states (Models 1 through N) with traffic quantities for each link and activity load at each node. Information such as snapshots of traffic and activity at each node in an extracted deployment for a full model may not be needed in a system according to embodiments. Topology and final performance in throughput may be sufficient to perform the iterations described herein. The states may include a variety of typical occurrences such as states at loading quintiles from high to low or states when faults or limits occur. In some embodiments, the deployment map in standardized format may be supplied in an automated fashion at the origin datacenter and may not be subject to interpretation because it is not a customer requirement but an actual observed state of the deployment. The relationship between this state and the application performance may be used to determine policy settings through iterative simulation so that the resulting settings are particular to each datacenter and its particular operations. Among other things, this may reduce the liability at the origin datacenter as it is not asserting a particular set of policies will satisfy a customer—rather the origin datacenter provides observed quantities for the deployment map and measured application performance, and the burden is on the target datacenter or a third party to turn those into configurations.

It should also be noted that the topology format according to embodiments is not specific to a particular instance placement but rather is defined by the connections between them. Thus, the origin datacenter is not revealing its internal working by sharing the standardized deployment file (e.g., BRITE file).

Figure 3:
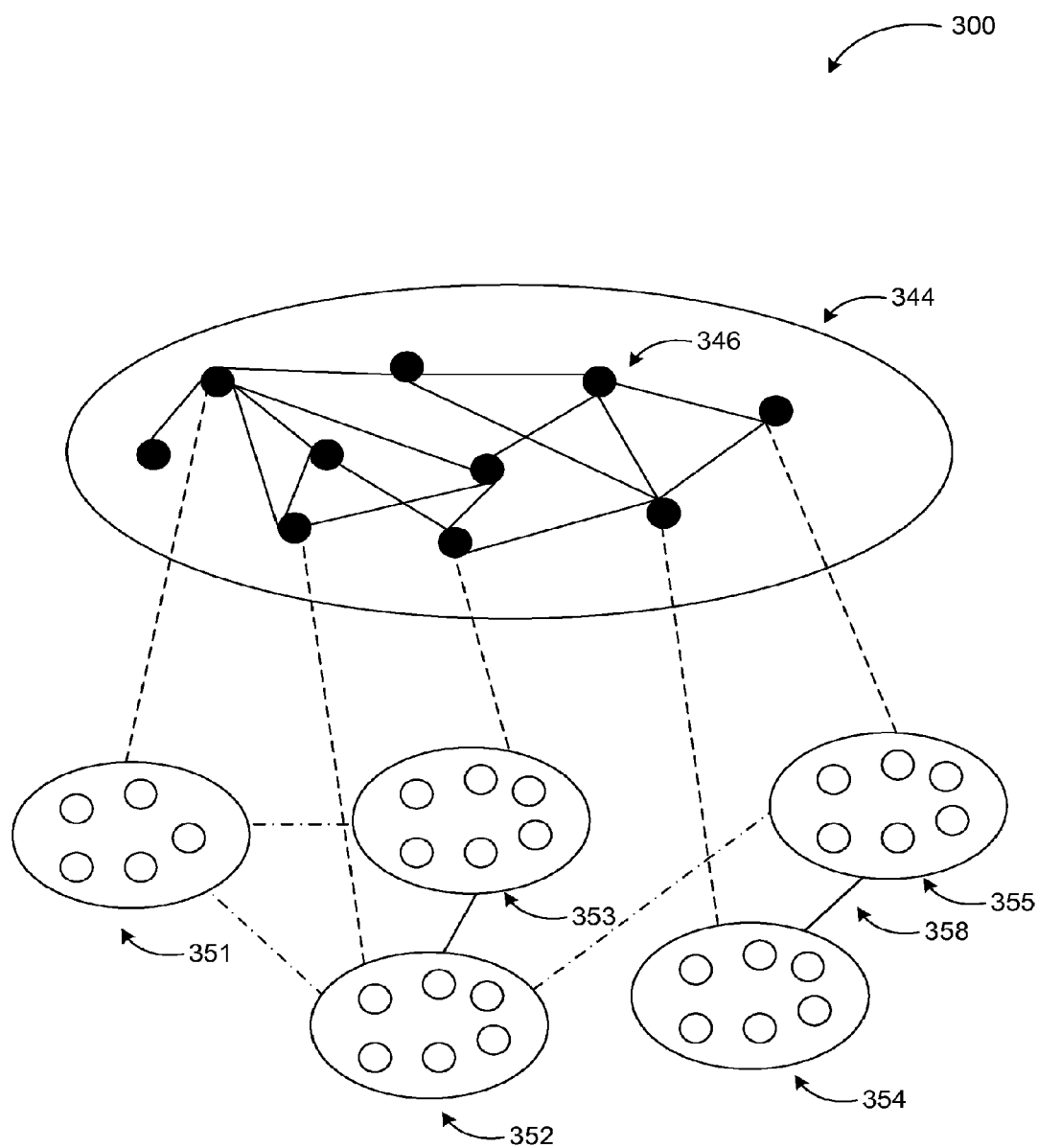
FIG. 3 illustrates an example top-down approach for generating hierarchical cloud topologies.

FIG. 3 illustrates an example top-down approach for generating hierarchical cloud topologies, arranged in accordance with at least some embodiments described herein.

Top-down is one of the approaches used by topology generators such as BRITE to generate hierarchical topologies. Top-down means that BRITE generates first an AS-level topology 344 according to one of the available flat AS-level models as shown in a diagram 300. Next, for each node in the AS-level topology (e.g., a node 346) a router-level topology may be generated (351 through 355) using a different generation model from the available flat models that can be used at the router-level. An edge connection mechanism 358 may be used to interconnect the router-level topologies 351-355 as dictated by the connectivity of the AS-level topology 344. The interconnection of router-level topologies in a representative way may employ edge connection mechanisms gradually increasing the set of edge connection methods with models that reflect what actually happens in Internet topologies. The actual AS identifiers need not be shared, only the topology and only the topology as it relates to the one customer being transferred—thus large areas of the network may be omitted.

The final topology may be obtained by flattening the hierarchical topology into a router-level topology composed of the individual topologies associated with each node at the AS-level. The configuration file for generating a top-down topology may include parameters controlling the bandwidth distribution for inter- and intra-domain links. These parameters may override the specific parameters for the AS- and router-level topologies. Bandwidths for the generated AS-level topology may be assigned according to the inter-domain distribution.

FIG. 4 illustrates conceptually a system for use of iterative simulation of measured performance for schema-free configuration management in cloud migration, arranged in accordance with at least some embodiments described herein.

Example embodiments enable customer requirements to be delivered as a short set of performance related metrics that a customer can relate to and specify at a business level like delay to serve each customer page at various loads or media file throughput. As shown in a diagram 400, an origin datacenter may deliver measured and achieved values on these metrics (a measured application performance 464) and an actual deployment topology and traffic map 462 of the customer deployment. A target datacenter 470 may then arrive at their own customer requirements in terms of target datacenter policies and service levels by iterative simulations—offering a customer multiple possible packages based on high level performance simulated using the actual deployment. Thus, a number of requirements that need to be exchanged may be substantially reduced while also reducing a room for schema misunderstanding and allowing the target datacenter to achieve high performance metric goals with their own mixtures of capabilities instead of adopting a complex service profile used by an origin datacenter 460, which may simply be inefficient at the target datacenter 470.

In the system described in the diagram 400, the deployment map 462 (which may be automatically generated) and measured application performance 464 may be supplied by the origin datacenter 460 as quantifiable, nonproprietary customer requirements. A simulation assembler 472 may take a collection of possible policy settings 474 generated by a policy system 478 and the received customer deployment map 476, and generate a simulation to run on a simulator 480 at the target datacenter 470. Results from the simulation may be compared to previous measured application performance (482) and if it does not reach suitable requirements the policy settings may be iterated through the policy system 478. If target performance is reached the full set of service level policies may be added as a customer option (484) summarized by high level performance specifications and the simulation may be iterated again until completion. When the cycle is completed a customer menu of service levels 488 may be made available with summarized performance options and associated full service level data, which may or may not be presented to the user.

A customer can thus select a target performance and the full list of policies, and needed service levels may be delivered by the system to a configuration manager 486 enabling automatic customer selection of complex service options without requiring customers to learn or manually set underlying policies. It should be noted that the policies may be developed within the target datacenter 470 based on unambiguous observed data that can be measured by the origin datacenter 460 or by the customer.

Once the deployment topology is provided for a deployment map 476, the simulation assembler 472 may combine the deployment map 476 with a test set of policy settings that define metrics such as allowed bandwidth, distance between topology points (e.g., how far apart on a network the tasks are allowed to be run), response time for various services, and similar particulars of the target datacenter 470.

Because the policy setting options are completely defined within the target datacenter 470, the datacenter may run optimal policy options without having to match or translate policy settings of a different datacenter. Thus, the iterative simulation of different policies to match origin application performance effectively allows the setting of the target datacenter 470 policies without exchanging any information between datacenters that is part of a requirement schema as is conventionally considered. This allows performance testing and matching even during non-cooperative transfers, for example, as the needed data can be accessed by the customer.

As discussed above, policy mixes that provide acceptable results may be saved to provide the customer menu of service levels 488. The customer menu may not necessarily have to identify the policy details behind the various options. Instead, it may present appropriate performance metrics (e.g., measurements using the same metric as the measured application performance 464 and maintain a link within the policy system 478 to the appropriate policies that are associated with an offering. Once the customer selects an option, the related policies from the policy system 478 may be delivered to the configuration manager 486 for implementation. This may enable a customer to select from a variety of performance options that include matching the previous measured application performance 464, which may be priced based on the cost to generate such performance at the target datacenter 470. In some examples, the options may be filtered. For example, if a large number of options qualify, a top predefined number of the options or one from each performance category may be shown to maximize pricing selection granularity.

Measuring the data at the origin datacenter 460 may be performed by the datacenter itself or by a series of programs within a customer deployment. For example, the target datacenter 470 may provide a customer with packet sniffers and software instrumentation, which may be executed within a customer deployment without assistance from the origin datacenter 460, for example hop-checking or by manipulating the "time-to-live" variable on exploratory packets to measure interconnection topology among the deployed instances. Additionally, a third party service may also perform the above described tasks as an independent entity.

Instead of providing finer and finer schema and guidelines for running a customer process to attempt to reduce misinterpretation and address possible management forms, a system according to some embodiments allows for a simple and quantitative communication that is devoid of assumptions about datacenter operations. The origin datacenter 460 may share measurable data about the customer's deployment and leave it to the target datacenter 470 to derive the appropriate resulting policies. Moreover, liability or the need to cooperate may be removed from the origin datacenter 460. Indeed, it can be done without the knowledge or participation of the origin datacenter 460 in some implementations. At the same time, the proprietary architectural details of both the origin and target data centers are protected. Furthermore, a target datacenter is enabled to show a convincing scenario with traceable analysis of how it expects to run the customer's deployment and achieve the metrics the customer may care about at an acceptable level.

Figure 5:
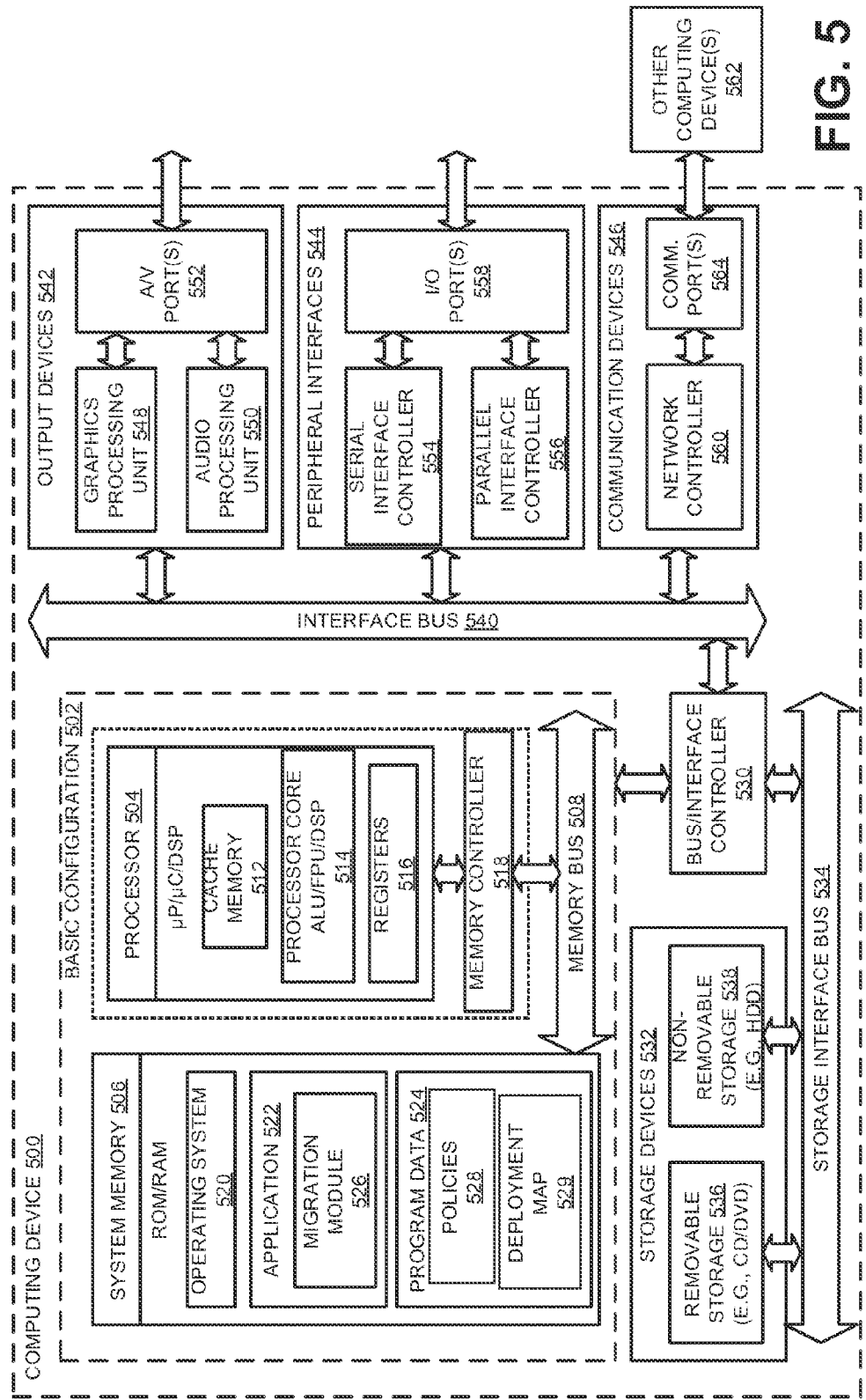
FIG. 5 illustrates a general purpose computing device, which may be used to implement iterative simulation of measured performance for schema-free configuration management in cloud migration.

FIG. 5 illustrates a general purpose computing device 500, which may be used to implement iterative simulation of measured performance for schema-free configuration management in cloud migration, arranged in accordance with at least some embodiments described herein. For example, computing device 500 may be used as a server at target datacenter 470 of FIG. 4. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one or more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may be datacenter management applications, migration management applications, or similar ones, and include a migration module 526, which may receive a deployment map and measured performance results from a source datacenter, perform simulation on the target datacenter, and determine suitable policy settings that satisfy customer requirements for migration as described herein. The program data 524 may include, among other data, policies 528, a deployment map 529, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers at a datacenter, customer computers, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for implementing iterative simulation of requirement metrics for assumption and schema-free configuration management in cloud migration. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
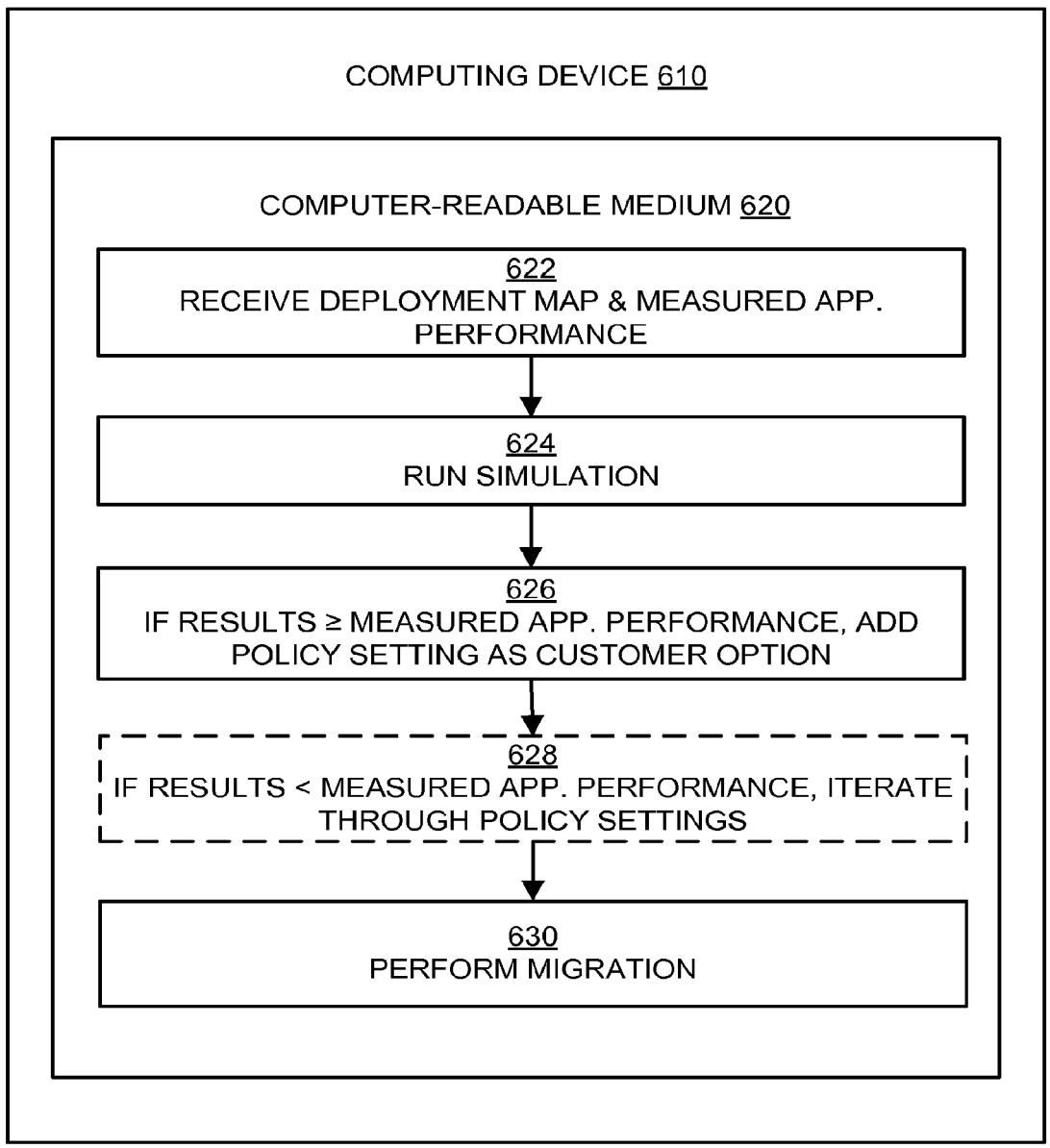
FIG. 6 is a flow diagram illustrating an example method that may be performed by a computing device such as device 500 in FIG. 5.

FIG. 6 is a flow diagram illustrating an example method for iterative simulation of requirement metrics for assumption and schema-free configuration management in cloud migration that may be performed by a computing device such as the device 500 in FIG. 5 or a server at the target datacenter 470 of FIG. 4, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process for iterative simulation of requirement metrics for assumption and schema-free configuration management in cloud migration may begin with block 622, "RECEIVE DEPLOYMENT MAP & MEASURED APP. PERFORMANCE", where a migration application or module such as the migration module 526 of FIG. 5 may receive a deployment map and measured application performance results from a source datacenter such as the origin datacenter 460 of FIG. 4. Block 622 may be followed by block 624, "RUN SIMULATION," where one or more simulations may be run at the target datacenter such as the target datacenter 470 of FIG. 4 to determine how the application would perform if migrated to the target datacenter.

Block 624 may be followed by block 626, "IF RESULTS≥MEASURED APP. PERFORMANCE, ADD POLICY SETTING AS CUSTOMER OPTION". At block 626, results of the simulation run at block 624 may be compared to the received measured performance from the source datacenter. If the results indicate acceptable or better performance at the target datacenter compared to the measured performance at the source datacenter, the current policy settings may be added as customer option. In some embodiments, the options may be filtered. For example, if 100 options qualify, a top ten (or any predefined number) or one from each performance decile may be shown to maximize pricing selection granularity. At optional block 628, "IF RESULTS<MEASURED APP. PERFORMANCE ITERATE THROUGH POLICY SETTINGS", where the migration module 526 may iterate through the policy settings and possible run more simulations to determine acceptable policy settings if the results are less than the measured performance received from the origin datacenter 460 of FIG. 4. In some embodiments, the system may iterate through the simulations regardless of the decision. Block 628 may be followed by block 630, "PERFORM MIGRATION," where the migration may be executed according to the determined policy settings.

The blocks included in the above described process are for illustration purposes. Iterative simulation of requirement metrics for assumption and schema-free configuration management in cloud migration may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the migration module 526 may undertake one or more of the tasks shown in FIG. 7 in response to the instructions 704 conveyed to the processor 504 by the medium 702 to perform actions associated with providing graphics render matching for displays as described herein. Some of those instructions may include, for example, instructions for receiving deployment map and measured application performance; running simulation; if results and equal or greater than measured application performance, adding policy setting as customer option; and if results are less than measured application performance, iterating through policy settings according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for configuration management in cloud migration based on iterative simulation of measured performance may include receiving a topology description of an existing customer deployment and a set of achieved performance levels at a current datacenter, combining the topology description with a test set of policy settings, and iterating one or more simulations using the test set of policy settings across available service levels to find policy settings that at least match the achieved performance levels.

According to other examples, the method may also include performing the combining and the iterating at a third party service based on received destination datacenter policies and service levels and providing the found policy settings that at least match the achieved performance levels to one of a customer and the destination datacenter. The method may further include performing the combining and the iterating at a destination datacenter based on destination datacenter policies and service levels, providing the found policy settings that at least match the achieved performance levels to a customer, and offering the customer multiple possible packages based on the found policy settings and simulation results.

According to further examples, the policy settings may define allowed bandwidth, distance between topology points, response time for one or more services, a storage limit, a storage quota, and/or a scalability factor. The performance levels may be provided as quantifiable nonproprietary customer requirements, and iterating the one or more simulations may include comparing simulation results to the achieved performance levels; if the simulation results fail to reach the achieved performance levels, iterating through the policy settings; else adding current policy settings as a customer option summarized by high level performance specifications and iterating the comparison until all policy settings of a destination datacenter are processed.

According to yet other examples, the method may also include employing the simulation results to automatically generate a menu of options and associated performances for a customer, providing the options and the associated performances to a configuration manager when the customer chooses a setup, and presenting the menu of options to the customer. Policy setting details may be hidden in the menu of options presented to the customer and one or more performance metrics for an offered package are presented with a link to associated policy settings. The method may further include enabling the customer to select a target performance and delivering a full list of policy settings and service levels to the configuration manager such that the customer is able to select complex service options without having to learn or manually set underlying policies. The achieved performance levels may be measured at the current datacenter by one of the current datacenter, by a customer, by a destination datacenter, and by third party customer deployment service without assistance from the current datacenter. The topology description of the existing customer deployment may be provided employing a standardized format. The standardized format may be generated by a representative Internet topology generator. The cloud migration may include a single source to multiple target migration, a multiple source to single target migration, or a multiple source to multiple target migration.

According to other examples, a computing device for implementing configuration management in cloud migration based on iterative simulation of measured performance may include a memory configured to store instructions and a processing unit configured to execute a migration application in conjunction with the instructions. The migration application may receive a topology description of an existing customer deployment and a set of achieved performance levels at a current datacenter; combine the topology description with a test set of policy settings; and iterate one or more simulations using the test set of policy settings across available service levels to find policy settings that at least match the achieved performance levels.

According to some examples, the computing device may be part of a third party service and the migration application may further combine and iterate based on received destination datacenter policies and service levels and provide the found policy settings that at least match the achieved performance levels to one of a customer and the destination datacenter. The computing device may also be part of a destination datacenter and the migration application may combine and iterate based on destination datacenter policies and service levels, provide the found policy settings that at least match the achieved performance levels to a customer, offer the customer multiple possible packages based on the found policy settings and simulation results.

According to further examples, the policy settings may define allowed bandwidth, distance between topology points, response time for one or more services, a storage limit, a storage quota, and/or a scalability factor. The performance levels may be provided as quantifiable nonproprietary customer requirements, and the migration application may be configured to iterate the one or more simulations by comparing simulation results to the achieved performance levels; if the simulation results fail to reach the achieved performance levels, iterating through the policy settings; else adding current policy settings as a customer option summarized by high level performance specifications and iterating the comparison until all policy settings of a destination datacenter are processed.

According to yet other examples, the migration application may employ the simulation results to automatically generate a menu of options and associated performances for a customer, provide the options and the associated performances to a configuration manager when the customer chooses a setup, and present the menu of options to the customer. Policy setting details may be hidden in the menu of options presented to the customer and one or more performance metrics for an offered package are presented with a link to associated policy settings. The migration application may also enable the customer to select a target performance and deliver a full list of policy settings and service levels to the configuration manager such that the customer is able to select complex service options without having to learn or manually set underlying policies. The achieved performance levels may be measured at the current datacenter by the current datacenter, by a destination datacenter, by a customer, or by third party customer deployment service without assistance from the current datacenter. The topology description of the existing customer deployment may be provided employing a standardized format, where the standardized format may be generated by a representative Internet topology generator. The cloud migration may include a single source to multiple target migration, a multiple source to single target migration, or a multiple source to multiple target migration.

According to further examples, a computer-readable storage medium may have instructions stored thereon for configuration management in cloud migration based on iterative simulation of measured performance. The instructions may include receiving a topology description of an existing customer deployment and a set of achieved performance levels at a current datacenter; combining the topology description with a test set of policy settings; and iterating one or more simulations using the test set of policy settings across available service levels to find policy settings that at least match the achieved performance levels.

According to some examples, the instructions may further include performing the combining and the iterating at a third party service based on received destination datacenter policies and service levels and providing the found policy settings that at least match the achieved performance levels to one of a customer and the destination datacenter. The instructions may also include performing the combining and the iterating at a destination datacenter based on destination datacenter policies and service levels, providing the found policy settings that at least match the achieved performance levels to a customer, and offering the customer multiple possible packages based on the found policy settings and simulation results.

According to other examples, the policy settings may define at least one from a set of: allowed bandwidth, distance between topology points, response time for one or more services, a storage limit, a storage quota, and/or a scalability factor. The performance levels may be provided as quantifiable nonproprietary customer requirements, and iterating the one or more simulations may include comparing simulation results to the achieved performance levels; if the simulation results fail to reach the achieved performance levels, iterating through the policy settings; else adding current policy settings as a customer option summarized by high level performance specifications and iterating the comparison until all policy settings of a destination datacenter are processed.

According to yet other examples, the instructions may include employing the simulation results to automatically generate a menu of options and associated performances for a customer, providing the options and the associated performances to a configuration manager when the customer chooses a setup, and presenting the menu of options to the customer. Policy setting details may be hidden in the menu of options presented to the customer and one or more performance metrics for an offered package are presented with a link to associated policy settings. The instructions may also include enabling the customer to select a target performance and delivering a full list of policy settings and service levels to the configuration manager such that the customer is able to select complex service options without having to learn or manually set underlying policies.

According to yet further examples, the achieved performance levels may be measured at the current datacenter by one of the current datacenter, by a destination datacenter, by a customer, and by third party customer deployment service without assistance from the current datacenter. The topology description of the existing customer deployment may be provided employing a standardized format, where the standardized format is generated by a representative Internet topology generator. The cloud migration may include a single source to multiple target migration, a multiple source to single target migration, or a multiple source to multiple target migration.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for configuration management in cloud migration based on one or more simulations of measured performance, the method comprising:
receiving a topology description of an existing customer deployment and a set of achieved performance levels at a current datacenter;
combining the topology description with a test set of policy settings at a destination datacenter;
in response to a cooperative transfer of data from the current datacenter to the destination datacenter, iterating the one or more simulations of the measured performance at the destination datacenter using the test set of the policy settings across available service levels to identify the policy settings that at least match the set of achieved performance levels; and
in response to a non-cooperative transfer of the data from the current datacenter to the destination datacenter,
testing the available service levels at the destination datacenter to identify the policy settings that at least match the set of achieved performance levels; and
enabling a customer to access the data at the destination datacenter that matches the set of achieved performance levels.

2. The method according to claim 1, further comprising:
performing the combining and the iterating at a third party service based on received destination datacenter policies and the available service levels; and
providing the policy settings that at least match the set of achieved performance levels to one of the customer and the destination datacenter.

3. The method according to claim 1, further comprising:
performing the combining and the iterating at the destination datacenter based on received destination datacenter policies and the available service levels; and
providing the policy settings that at least match the set of achieved performance levels to the customer.

4. The method according to claim 3, further comprising:
offering the customer multiple possible packages based on the policy settings and simulation results.

5. The method according to claim 1, wherein the policy settings define at least one from a set of: allowed bandwidth, distance between topology points, response time for one or more services, a storage limit, a storage quota, and/or a scalability factor.

6. The method according to claim 1, wherein iterating the one or more simulations comprises:
comparing simulation results to the set of achieved performance levels;
if the simulation results fail to reach the set of achieved performance levels, iterating through the policy settings; else
adding current policy settings as customer options summarized by high level performance specifications; and
iterating a comparison of the simulation results until the policy settings of the destination datacenter are processed.

7. The method according to claim 6, further comprising:
employing the simulation results to automatically generate a menu of the customer options and associated performances for the customer; and
providing the customer options and the associated performances to a configuration manager when the customer chooses a setup.

8. A computing device to implement configuration management in cloud migration based on one or more simulations of measured performance, the computing device comprising:
a memory configured to store instructions; and
a processing unit configured to execute a migration application in conjunction with the instructions, wherein the migration application is configured to:
receive a topology description of an existing customer deployment and a set of achieved performance levels at a current datacenter;
combine the topology description with a test set of policy settings at a destination datacenter;
in response to a cooperative transfer of data from the current datacenter to the destination datacenter, iterate the one or more simulations of the measured performance at the destination datacenter using the test set of the policy settings across available service levels to identify the policy settings that at least match the set of achieved performance levels; and
in response to a non-cooperative transfer of the data from the current datacenter to the destination datacenter,
test the available service levels at the destination datacenter to identify the policy settings that at least match the set of achieved performance levels; and
enable a customer to access the data at the destination datacenter that matches the set of achieved performance levels.

9. The computing device according to claim 8, wherein the set of achieved performance levels provided as quantifiable nonproprietary customer requirements.

10. The computing device according to claim 8, wherein the migration application is configured to:
iterate the one or more simulations by:
comparing simulation results to the set of achieved performance levels;
if the simulation results fail to reach the set of achieved performance levels, iterating through the policy settings; else
adding current policy settings as customer options summarized by high level performance specifications; and
iterating a comparison of the simulation results until the policy settings of the destination datacenter are processed;
employ the simulation results to automatically generate a menu of the customer options and associated performances for the customer;
provide the customer options and the associated performances to a configuration manager when the customer chooses a setup; and
present the menu of the customer options to the customer.

11. The computing device according to claim 10, wherein the policy setting details are hidden in the menu of the customer options presented to the customer and one or more performance metrics for an offered package are presented with a link to associated policy settings.

12. The computing device according to claim 10, wherein the migration application is further configured to:
enable the customer to select a target performance and deliver a full list of the policy settings and the available service levels to the configuration manager such that the customer is able to select complex service options without having to one of: learn set underlying policies and manually set underlying policies.

13. The computing device according to claim 8, wherein the set of achieved performance levels are measured at the current datacenter by one of the current datacenter, by the destination datacenter, and by a third party customer deployment service without assistance from the current datacenter.

14. The computing device according to claim 8, wherein the topology description of the existing customer deployment is provided employing a standardized format.

15. The computing device according to claim 14, wherein the standardized format is generated by a representative Internet topology generator.

16. The computing device according to claim 8, wherein the cloud migration includes one of: a single source to multiple target migration, a multiple source to single target migration, and a multiple source to multiple target migration.

17. A non-transitory computer-readable storage medium having instructions stored thereon for configuration management in cloud migration based on iterative simulation of measured performance, the instructions comprising:

receiving a topology description of an existing customer deployment and a set of achieved performance levels at a current datacenter;

combining the topology description with a test set of policy settings at a destination datacenter;

in response to a cooperative transfer of data from the current datacenter to the destination datacenter, iterating the one or more simulations of the measured performance at the destination datacenter using the test set of the policy settings across available service levels to identify the policy settings that at least match the set of achieved performance levels;

in response to a non-cooperative transfer of the data from the current datacenter to the destination datacenter, testing the available service levels at the destination datacenter to identify the policy settings that at least match the set of achieved performance levels; and enabling a customer to access the data at the destination datacenter that matches the set of achieved performance levels;

comparing simulation results to the set of achieved performance levels;

if the simulation results fail to reach the set of achieved performance levels, iterating through the policy settings; else adding current policy settings as customer options summarized by high level performance specifications; and iterating a comparison of the simulation results until the policy settings of the destination datacenter are processed.

18. The non-transitory computer-readable storage medium of claim 17, wherein a standardized format is generated by a representative Internet topology generator.

19. The non-transitory computer-readable storage medium of claim 17, wherein the cloud migration includes one of: a single source to multiple target migration, a multiple source to single target migration, and a multiple source to multiple target migration.

20. The non-transitory computer-readable storage medium of claim 17, wherein the instructions further comprise:

employing the simulation results to automatically generate a menu of the customer options and associated performances for the customer;

providing the options and the associated performances to a configuration manager when the customer chooses a setup; and presenting the menu of the customer options to the customer.

\* \* \* \* \*